3,816,477
MECHANICALLY STABLE HEAT RESISTANT
EPOXY RESIN
Edward J. Traynor, Jr., Stoughton, Mass., and Lawrence
D. Hofmeister, Santa Monica, Calif., assignors to
Westinghouse Electric Corporation, Pittsburgh, Pa.
No Drawing. Continuation of abandoned application Ser.
No. 847,739, Aug. 5, 1969. This application Apr. 24,
1972, Ser. No. 247,045
Int. Cl. C08g *30/00*
U.S. Cl. 260—348                               1 Claim

ABSTRACT OF THE DISCLOSURE

A mechanically stable heat-resistant epoxy resin is made by reacting bis-(hydroxymethylphenyl)-ether with epichlorohydrin. This produces an epoxy-resin monomer or prepolymer that may be cured in accordance with practices usual in the art, yielding a cured resin that exhibits good mechanical stability and heat resistance.

---

This is a continuation of application Ser. No. 847,739 filed Aug. 5, 1969, and now abandoned.

BACKGROUND OF THE INVENTION (1) Field of the invention

This invention relates to epoxy resins.

(2) Description of the prior art

Epoxy resins of various kinds are known, including, among others, the resins based upon a monomer obtained by reacting bisphenol-A with epichlorohydrin. Bisphenol-A is sometimes also called bis-(4-hydroxyphenyl)-2,2-propane, and its reaction with epichlorohydrin is shown in U.S. Pat. No. 3,073,799. The epoxy resins of the kind obtained from the reaction of epichlorohydrin with bisphenol-A are among the earliest of the known epoxy resins, being described in Castan U.S. Pat. No. 2,324,483. Such resins exhibit the advantages that characterize the epoxy resins as a family: they may be cured in deep sections without the evolution of volatiles, yielding a clear, bubble-free product; they are soluble in various solvents; they exhibit excellent chemical resistance, in the cured state, to various media; and their adhesion to other materials is excellent.

Other kinds of epoxy resins are, of course, also known. These include the ones based upon a monomer obtained by reacting epichlorohydrin with glycerol and the ones obtained by reacting epichlorohydrin with bisphenol-F (bis-4,4'-hydroxyphenylmethane, or with other bisphenols, for example those in which the phenol nuclei are separated by alkyl groups with at least several carbon atoms, or with a resinous phenol-formaldehyde product such as a novolac.

It is known that an epoxy resin (diglycidyl ether) monomer of one of the kinds mentioned above may be cured, yielding a resin, by heating the same in the presence of a suitable curing agent, alone or with a suitable catalyst, preferably the latter. The usual catalysts and/or curing agents are amines or acid anhydrides. It is usual for such mixtures to be capable of gelling when heated for about 2–15 minutes at 150° C. In the preparation of objects coated with such resin for use, it is not unusual to bake the object, having the gelled resin coating thereon, for an additional substantial period of time at a moderate temperature, such as by holding for overnight at 150° C., 6 hours at 175° C., and then overnight at 200° C. Usually, this effects a thorough cure of the resin.

Objects coated with epoxy resin made in this way are sometimes subjected to a high temperature in service, such as 200° C. For such applications, it is important to consider the weight loss that occurs, and this is determined in various ways known to those skilled in the art. One such test involves exposing samples for prolonged periods of time in air at 250° C. and noting the losses in weight that are observed as a result of such exposure. In such tests, it has developed that the kind of curing agent used may have a considerable effect even if the kind of epoxy resin used remains the same. For example, with a resin of the kind based on epichlorohydrin and bisphenol-A, cured with 5 parts of piperidine, the weight loss after 7 weeks at 250° C. is about 24.0%, whereas with the same resin, cured with 15 parts per 100 of resin of m-phenylenediamine as curing agent, the weight loss is about 68.5%. Resins are known that, in this test, lose less than 3% of their weight in one week at 250° C., and about 12.0% after 7 weeks. There are instances, however, in which a resin may prove quite satisfactory despite its having high temperature weight loss properties that are not that good. Other properties, such as high bond strength and temperature use and good maintenance of high bond strength despite aging at temperatures up to 250° C. may also be important.

There is known, moreover, the problem of providing a satisfactory insulating varnish, capable of long-time use at a high temperature, such as 180° C. In one type of screening test used to develop a satisfactory insulating varnish, a pair of twisted wires is coated with a suitable enamel, and then with the varnish material. Enamels used may be of different kinds, such as polyester-amide, terephthalate-polyester, aromatic amide-imide, or aromatic polyimide. The tests to which samples prepared as indicated above are subjected involves exposing them at different elevated temperatures to determine their expected life at those temperatures. After conducting life tests according to IEEE-57 Test Procedure at, for example, 275° C., 300° C. and 325° C., it becomes possible, by plotting reciprocal of absolute temperature versus logarithm of observed average life, to obtain by extrapolation the temperature, substantially lower, at which a longer life such as 100,000 hours may be expected, and in the case of a material that is to be used as a Class H varnish, this lower temperature yielding the desired expected life must be at least 180° C. It has developed that in tests of this kind, some varnish materials appear to be incompatible with certain enamel materials. Tested individually, the varnish material and the enamel each yields low weight-loss values during long-time exposure at high temperatures, but when used together, they yield a system having a short observed life.

For the most part, the insulating varnishes that have been known for use in Class H applications have been silicone resins. Though adequate in their long-term high-temperature performance, systems of enamel and varnish wherein the varnish is a silicone resin have two major drawbacks, namely, high cost and low high-temperature bond strength. At 150° C., most of the silicon varnishes give a bond strength on the order of about 2 pounds or less in a Helical Coil Test described by J. F. Dexter, *Insulation*, September 1955.

There is a known compound 4,4'-bishydroxymethyl diphenyl ether, which is used in the making of epoxy resins in accordance with the present invention. This compound has the following structural formula:

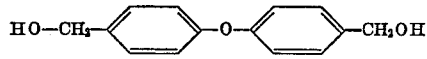

The above compound may be prepared, in ways known to skilled organic chemists, from the corresponding chloromethyl compound, which is also known (see U.S. Pat. No. 3,128,259), this being prepared by the chloromethylation of diphenylene oxide, a compound that can be obtained by distillation of coal-tar heavy oil and in other ways. Position isomers of the above-described compound and, indeed, mixtures of the position isomers are known and may be employed in the present invention. The position isomers and mixtures thereof may be prepared from appropriate chloromethyl analogs. Small amounts of mono and trihydroxymethyl diphenyl ethers may be included.

BRIEF SUMMARY OF THE INVENTION

Epoxy-resin compositions having useful properties are made by reacting bis-(hydroxymethylphenyl)-ether with epichlorohydrin to make a material, consisting principally of the diglycidyl ether, that may then be cured by reaction with or in the presence of suitable curing agents, to form a polymer of high molecular weight.

DESCRIPTION OF THE PREFERRED EMBODIMENTS

In the making of epoxy-resin compositions, it is often difficult or impossible to determine, in more than a general way, what chemical reactions are occurring, and to what extent. Much depends upon the starting materials used, the solvents and catalysts (if any) that are employed, and the times and temperatures that are used. In the case of the reaction of bis-(hydroxymethylphenyl)-ether with epichlorohydrin, a primary reaction is that of the epichlorohydrin with the hydroxy group of the ether to form the monoglycidyl or diglycidyl ether. At the same time, it is possible for the epichlorohydrin to self-polymerize, tending to create a long-chain chlorine-containing molecule. The monoglycidyl or diglycidyl ether is capable of reacting with any bis-(hydroxymethylphenyl)-ether that is present in the reaction mix to form a dimer or trimer, and the epichlorohydrin may react with such dimer or trimer to provide thereon a glycidyl group that is capable of reacting with other hydroxy groups or glycidyl groups that are present in the mixture. In the presence of a base and at relatively high temperature, glycidyl groups from the monoglycidyl or diglycidyl ether may react, giving chain formation, or in some instances, cross-linking. If an acid anhydride or appropriate amine curing agent is present when the reaction between the bis-(hydroxymethylphenyl)-ether and the epichlorohydrin is started, the reaction may proceed rapidly to the production of a resin of high molecular weight, cross-linked to a great extent and containing substantially no epoxy groups in the product as it emerges from the reaction flask. For some purposes, this is tolerable, while for other purposes, it is not. In making a resin for potting or encapsulation, it is intended that the predominant reaction be that of the formation of a diglycidyl ether. This substance, having a relatively low molecular weight but containing epoxy oxygens capable of further reaction, is then dissolved in a solvent and applied to the article to be enclosed. Thereafter, as a result of heating, further reaction takes place, with the diglycidyl ether reacting with itself and/or with the curing agent to form desired molecules of high molecular weight.

In many instances, it is desired that the bis(hydroxymethylphenyl)-ether be reacted with epichlorohydrin to produce a material of relatively low molecular weight. This may be done conveniently by heating the substances, together with a suitable solvent and, if desired, a catalyst, such as a Lewis acid, under relatively mild conditions. Such a mixture is heated to reflux temperature and held for a suitable period of time, such as 1–5 hours. The solvent is then removed under reduced pressure. It is desirable at this point to treat the reaction product so as to insure the removal of any free hydrochloric acid remaining therein, and this may be done by treating with alkali-metal hydroxide, carbonate, or bicarbonate. In an example presented hereinbelow, sodium hydroxide is used. This may be added as an aqueous solution, with the water being removed by vacuum distillation. After removal of the water, the viscous remaining material may be diluted with a suitable solvent, such as acetone, and then filtered to remove the salt and other impurities. There is thus obtained a material having an epoxide equivalent weight of about 350–425 and a chlorine content of 5%–15%.

It is seen that with a procedure such as that described above, there is obtained to a substantial major extent the reaction:

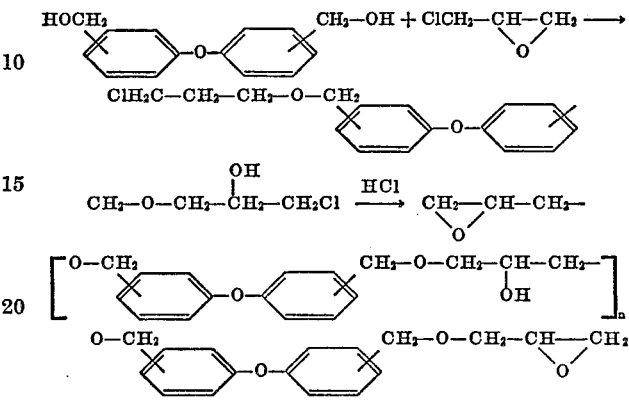

where $n$ is an integer of 0 to about 5, but there also occurs, to some extent, the reactions:

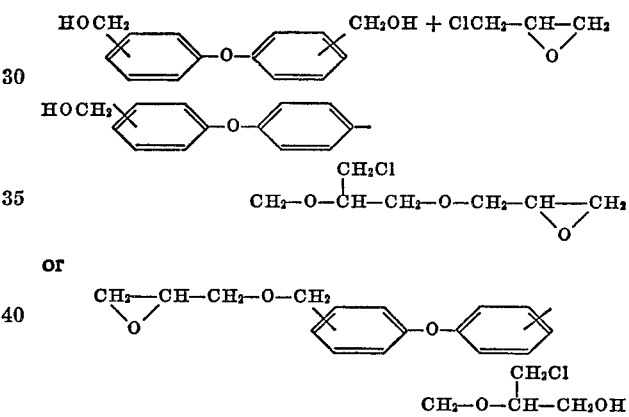

or

The products indicated in the above reactions may themselves be present or may further react as indicated above. This accounts for the chlorine detected in the product.

The three products of the reactions given above are each capable of being polymerized with an additional amount of bishydroxymethyl diphenyl ether. These reactions are represented below:

(1)
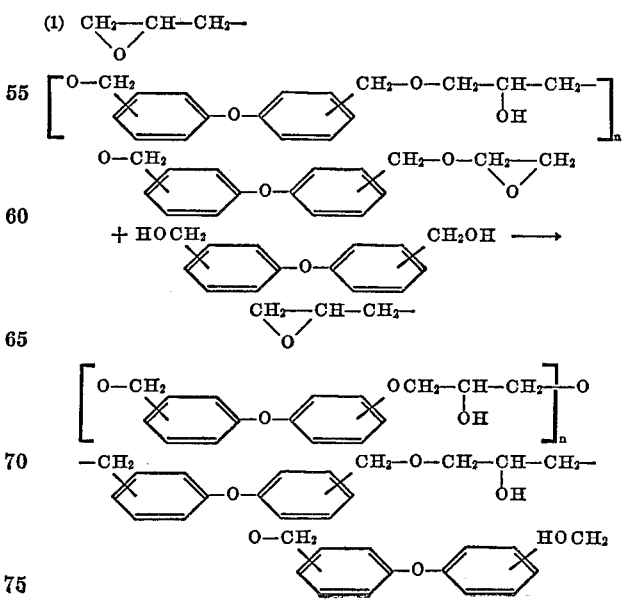

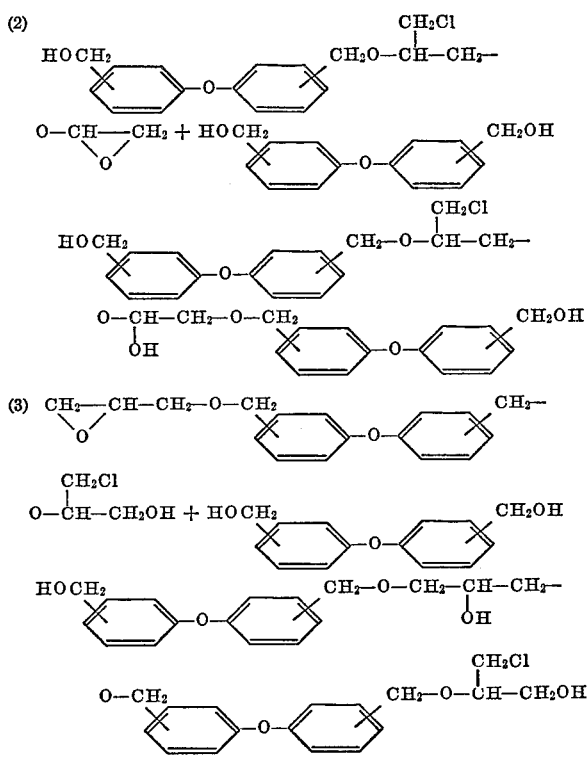

Hereinbelow, there will be taught the manner of conducting such reactions, as well as a different way of reacting epichlorohydrin and bis-(hydroxymethylphenyl)-ether to yield directly a material of high molecular weight. Returning, however, to the viscous product prepared in the manner already set forth above, and considering that it has a relatively low epoxide equivalent weight (weight of resin in grams which contain 1 gram equivalent of epoxy oxygen), indicative of good reactivity with conventional amine and anhydride curing agents, there will now be taught the manner of the use of this viscous product to obtain various resins in the cured state, some of which exhibit good properties as respects weight loss during long-time exposure at high temperatures and/or bond strength.

The viscous material prepared as taught above is too thick to be readily mixed with curing agents at room temperature. The material is warmed to 150° C. to reduce its viscosity, mixed with the curing agent, and evacuated to remove air bubbles. One problem is that at the elevated temperature and in the presence of the curing agent, gelation tends to occur rather rapidly in some instances; if gelation occurs too rapidly, air bubbles introduced into the warmed resin during the mixing operation will not be removed. Formation of the air bubbles may be avoided by blending the ingredients and melting under contact pressure.

As examples of curing agents that may be used, there may be mentioned C-8 (described hereinbelow), m-phenylene diamine, dodecenyl succinic anhydride, methyl nadic anhydride and the adduct of pyromellitic dianhydride and ethylene glycol. Samples made in this way exhibited, in long-term high temperature weight-loss tests, losses substantially less than the weight loss of conventional epoxy resins of the epichlorohydrin plus bisphenol-A type. In helical-coil bond strength tests, values after 1000 hours of aging at 200° C. on the order of 20 pounds were obtained when tested at 150° C., these comparing favorably with bond strengths of about 2 pounds or less for the silicone resins previously used in Class H applications.

Returning now to the further reaction of the viscous product mentioned above with additional amounts of bis-(hydroxymethylphenyl)-ether, it is possible, for example, to mix appropriate amounts of these two materials, warming them to 110° C. to obtain a good solution, and then adding a suitable reaction catalyst, such as dimethyl benzyl amine or other tertiary amine. The reaction may be conducted in the absence of a solvent and at temperatures slowly increasing, in the general range of 120° C.– 160° C., for a suitable period of time, up to about 30 hours. The reaction progresses slowly, with the formation of polymer molecules of increasingly greater molecular weight and greater epoxide equivalent weight. After reacting for about 26 hours, there is obtained a material with an epoxide equivalent of about 1900.

This material of higher molecular weight may be used in a manner generally similar to that described above. That is, it may be warmed to reduce its viscosity and mixed with curing agents of the kind disclosed above and then cured to obtain cured-state resins. In weight loss tests for 7 or 8 weeks at 250° C., it was apparent that the weight losses on fully cured samples of this invention were considerably lower than the weight losses on fully cured DGEBA resins.

As mentioned above, there is a way of reacting epichlorohydrin with bis-(hydroxymethylphenyl)-ether to produce directly compounds of large molecular weight. Stoichiometric quantities (2 mols of epichlorohydrin per 1 mol of bis(hydroxymethylphenyl)-ether of the starting materials are reacted in the presence of sodium hydroxide or other alkali-metal hydroxide, with the reaction proceeding immediately to the production of a viscous, yellow resin of relatively high average molecular weight. This may be done by combining the two components in the reaction flask, heating them to about 100° C, and then adding dropwise to the heated solution an aqueous solution of the alkali-metal hydroxide. After permitting the mixture to reflux for 1 hour and then diluting with dichloroethylene solvent, and filtering to remove salt, distilled water and solvent, there is obtained a viscous yellow resin that appears to contain no unreacted epoxy groups. Similar results are obtained if the starting mixture consists of a mixture of 1 mol of bis-(hydroxymethylphenyl)-ether and 1 mol of epichlorohydrin. The reaction product may be diluted with dichloroethane as the solvent and treated with 1 part per 100 parts of resin of a Lewis-acid catalyst, such as BF$_3$-monoethylamine. Upon dilution with a suitable solvent, there is thus obtained a varnish that may be used in a system with an aromatic polyimide enamel, exhibiting a temperature for an expected 100,000-hour life of greater than 180° C., as measured by the dielectric twist test procedure. Suitably diluted, this material may also be used to impregnate flexible mica tape. The essentially monomeric precursor may be prepared with a large excess of epichlorohydrin in the order of more than three up to about 10 mols of epichlorohydrin to each mol of bis-(hydroxymethylphenyl)-ether.

In yet another manner of making epoxy-resin compositions, starting with bishydroxymethyl diphenyl ether and epichlorohydrin, there may be prepared a material that is useful for dry-type high-voltage barrier tubes or for a molding material, with or without fillers, namely, a material of relatively high molecular weight, obtained by reacting the two starting materials in the presence of a relatively high-boiling solvent, such as dimethylacetamide and, as catalyst, stannous tetrafluoride. There may be used, for example, 2 mols of epichlorohydrin per mol of bis-(hydroxymethylphenyl)-ether, a quantity of solvent sufficient to dissolve the same, and a small quantity of catalyst, such as about 0.3% of the weight of the ether plus the weight of the epichlorohydrin. The reactants are mixed together, heated to 120° C, held for 1 hour, and then mixed with a quantity of sodium aluminate or sodium hydroxide equivalent to the quantity of epichlorohydrin present. The resultant mixture is heated at 120° C. for 1.5 hours, cooled and filtered. At this point, there is produced a deep red solution which is again placed into the reaction flask, to which there is added bis-(hydroxymethylphenyl)-ether in an amount equivalent to that used originally. Stannous tetrafluoride is added periodically during the reaction in order to keep the solution on the acid side. The mixture is mildly heated over a period such as about 3.5 hours at about 135° C., and after filtration and removal at reduced pressure of the dimethylacetamide solvent, there is produced a viscous resin. Though liquid at 135° C., the viscous resin solidifies at room temperature to a brown waxy state.

Such resin may be re-dissolved in suitable solvent, such as dimethylacetamide, and then there may be added to the solution thus formed about 30 parts per 100 of resin of a suitable curing agent, such as m-phenylene diamene. Upon heating of such material in an open beaker for 1.5 hours at 130° C.–150° C., a color change to deep red is noted. The resin thus produced, in its solvent-containing condition, may be used as a surface coating material for laminates, tubes or helical coils. If treated with vacuum to remove solvent, the resin may be poured while hot and cooled to a solid that may be ground to a fine powder and used as a molding compound. Such powder may also be used in fluidized-bed applications.

The invention described above is illustrated by the following specific examples, which are to be interpreted as illustrative and not in a limiting sense:

EXAMPLE I

To reaction flask equipped with a stirring rod and a reflux condenser there is added dichloroethane, a solvent, in the amount of 400 cubic centimeters. Then, 2 grams of $BF_3$ diethyl ether, a catalyst, is added to the solvent. To the mixture there are added 230 grams (1 mol) of bis-(hydroxymethylphenyl)-ether and 184 grams (2 mols) of epichlorohydrin, in that order. The ingredients are heated to a reflux temperature and maintained there for 3 hours. The solvent is then removed under reduced pressure. Then, 80 grams (2 mols) of sodium hydroxide dissolved in 80 grams of water are added to the flask, and the flask is heated to about 70° C., and the water is removed by vacuum distillation. The mixture thus formed is then diluted with about 250 cubic centimeters of acetone and filtered to remove salt. This produced an epoxy resin of the kind first described above, having an epoxide equivalent weight of about 350–425 and a chlorine content of about 10 weight percent. This amounts to about one epoxide group and one chlorine atom per molecule of bishydroxymethyl diphenyl ether.

EXAMPLE II

The material of Example I is heated to 150° C. to reduce its viscosity, and there is mixed with it 22.4 parts by weight per 100 parts of resin of C–8 catalyst (described hereinbelow). With such a mixture, the gel time is about 30 seconds, but with the use of contact pressure molding at 150° C., there may be obtained a very good clear bubble-free sample of resin in the cured state. After being cured overnight at 150° C., then for 6 hours at 136° C., and then overnight at 200° C., followed by several hours at 250° C., sample specimens were cut to a size of ⅛ inch by ¾ inch by 1½ inches and aged in air at 250° C. After about 1100 hours aging at 250° C., the weight loss measured was 6.5 percent.

EXAMPLE III

The product of Example I is heated to 150° C. to reduce its viscosity, and then there are added 7.6 parts by weight per 100 parts of resin of m-phenylene diamine. Without the use of melting under contact pressure, there is obtained a fine clear casting (gel time at 150° C. of this mixture is about 15 minutes). The resin thus produced is cured and cut to samples as described above in Example II and tested for weight loss during prolonged exposure in air at 250° C. as described in Example II. After about 1100 hours aging 250° C., the weight loss measured was 3.5 percent.

EXAMPLE IV

The product of Example I is heated to 150° C. to reduce its viscosity and then mixed with 107 parts by weight per 100 parts of resin of dodecenyl succinic anhydride as curing agent. The gel time is long, and a bubble-free casting is produced. After curing, cutting to size and checking for weight loss after prolonged exposure in air at 250° C., as indicated above in Example II, the weight loss measured after about 1100 hours was 13.4 percent.

EXAMPLE V

The product of Example I is heated to 150° C. to reduce its viscosity. It is then mixed with 25 parts by weight per 100 parts of resin of methyl endomethylene tetrahydrophthalic anhydride, also known as methyl nadic anhydride, a well known curing agent for epoxy resins. At 150° C., the gel time is sufficiently long to enable clear castings to be prepared. After curing and cutting to size and checking weight loss as described in Example II, the weight loss measured after about 1100 hours was 9.6 percent.

It should be noted that after about 1100 hours aging at 250° C., bisphenol-A-epichlorohydrin epoxy resins cured in one instance with 5 phs. piperidine and in another with 15 phs. m-phenylenediamine had weight losses measuring 18.3 and 40.9 percent, respectively.

EXAMPLE VI

Using the product of Example 1 mixed with 4 parts by weight per 100 parts of resin of m-phenylene diamine as curing agent and, as a solvent, a mixture of 1 part by weight of acetone to 4 parts by weight of dichloroethane, sufficient of said solvent being used to produce, from the above mixture of ether and diamine, a suitable varnish, there is obtained a composition of matter that is used, in two coats, to cover to a depth of 0.003 inch a coil approximately ¼ inch in inside diameter and 3 inches long of No. 17 wire coated with aromatic polyimide enamel. The varnish is then cured by slowly raising the temperature to 200° C. in 3 hours, and then holding the coil at 200° C. overnight.

The coils such cured are then aged, at 175° C., 200° C. and 250° C. Certain ones of the coils are removed, periodically, and loaded as simple beams supported on each end, with the force being applied at the center of the coil, and the forces required to break the bond is observed as the result of the test, all tests being conducted at 150° C. The results of such Helical Coil Test are presented below in Table V:

TABLE V

| Time elapsed, hours | Bond strength, pounds | | |
|---|---|---|---|
| | Aged at 175° C. | Aged at 200° C. | Aged at 250° C. |
| 24 | 25.4 | 18.3 | 16.3 |
| | 21.2 | 22.7 | 21.8 |
| | 18.7 | 23.6 | 16.0 |
| 150 | | | 13.3 |
| | | | 16.8 |
| | | | 12.2 |
| 325 | | 20.8 | 13.1 |
| | | 16.7 | 14.5 |
| | | 20.9 | 7.8 |
| 800 | 21.6 | 22.0 | 2.0 |
| | 19.1 | 19.1 | |
| | 19.4 | 18.4 | |
| 1,000 | 22.9 | 22.4 | |
| | 22.3 | 21.3 | |
| | 22.0 | 18.9 | |

EXAMPLE VII

Two hundred thirty-four grams of the material of Example I are mixed with 52 grams of bis-(hydroxymethylphenyl)-ether. The mixture is heated to 110° C. for ½ hour to obtain a good solution, and then 1 gram of dimethylbenzyl amine is added as catalyst. The mixture is heated at 120° C. and maintained at substantially its boiling point (which eventually reached 150–160° C.) for a period of 26 hours, there being thus obtained a material having an epoxide equivalent weight of about 1900, as determined by a titration using the solution of hydrochloric acid in dioxane. The usual titration with pyridine hydrochloride in order to determine the epoxide equivalent weight tends, with this material, to yield inaccurate results, owing to discoloration of the pyridine hydrochloride.

EXAMPLE VIII

The material of Example VII is heated to 150° C. to reduce its viscosity, and is then mixed with 8 parts by weight per 100 parts of resin of C–8. C–8 is a stoichiometric adduct between a DGEBA epoxy resin (M.W. about 400 and E.E. about 185–200) and a primary amine, e.g. diethylene triamine. The resulting mixture has a gel time too short to permit production of an air-free sample by ordinary methods, but with melting at 150° C. under contact pressure, a solid, air-free sample is produced. After being cured, cut to size and weight loss measured, as described in Example II, the loss observed after about 1100 hours was 4.5 percent.

EXAMPLE IX

The product of Example VII is heated to 150° C. to reduce its viscosity and then mixed with 2 parts by weight per 100 parts of resin of m-phenylene diamine. The gel time of the resultant mixture is greater than 15 minutes, so that it is possible to produce bubble-free samples by the use of ordinary techniques. After being cured, cut to size and the weight loss measured at 250° C. as described in Example II, the loss observed after about 1100 hours was 2.2 percent.

EXAMPLE X

The product of Example VII is heated to 150° C. to reduce its viscosity and then mixed with 10 parts by weight per 100 parts of resin of dodecenyl succinic anhydride. The gel time of this mixture at 150° C. is 15 minutes, so that a bubble-free casting is produced by ordinary methods. After being cured, cut to size and the weight loss measured at 250° C. as described in Example II, the loss after about 1100 hours was 5.1 percent.

EXAMPLE XI

The product of Example VII is heated to 150° C. to reduce its viscosity and then mixed with 7 parts by weight per 100 parts of resin of methyl nadic anhydride. The gel time is sufficiently long to permit a clear casting to be obtained by ordinary methods. After being cured, cut to size and the weight loss measured at 250° C. as described above in Example II, the loss after about 1100 hours was 7.0 percent.

EXAMPLE XII

The product of Example VII is heated at 150° C. to reduce its viscosity and then mixed with 29 parts by weight per 100 parts of resin of adduct of pyromellitic dianhydride and bisphenol-A [bis-(4,4'-hydroxyphenyl)-2,2-propane]. The mixture obtained has a very short gel time at 150° C., so that contact pressure melting is used. There is thus obtained a resin that, after being cured, cut to size, and tested for weight loss during prolonged exposure to air at 250° C., as described above in Example II, the observed loss after 1100 hours was 5.8 percent.

EXAMPLE XIII

Into the reaction flask there are placed 115 grams (0.5 mol) of bis-(hydroxymethylphenyl)-ether and 92 grams (1 mol) of epichlorohydrin, and this mixture is heated to 100° C. Then to the flask there is added an aqueous solution comprising 40 grams of sodium hydroxide dissolved in 40 grams of water, this being added dropwise to the heated solution. When the sodium hydroxide solution has been added, the mixture is then refluxed for 1 hour and is diluted with dichloroethane as solvent. After filtration to remove salt and distilled water and solvent from the flask, there is obtained a viscous yellow material that, when tested, does not reveal any remaining, unreacted epoxy groups. In this manner, there is produced directly an epoxy-resin material of high molecular weight.

EXAMPLE XIV

The material of Example XIII is mixed with 1% by weight of Lewis-acid catalyst, namely, BF$_3$-monoethylamine and a suitable quantity of dichloroethane to produce a varnish. The varnish is applied in suitable thickness to a twisted pair of No. 17 copper wires coated with an enamel of the aromatic polyimide type, such as that sold by Du Pont under the designation "PYRE-ML." Fifty samples of such twisted pairs of wire, coated with the above-indicated enamel-varnish system, are prepared, and these were then tested at different elevated temperatures, namely, 225° C., 250° C., 275° C., 300° C. and 325° C., in order to determine average life at each temperature in accordance with IEEE 57 Test Procedure and thus obtained an indication of the temperature at which a life of 100,000 hours might be expected. The results of the above test are presented in Table XI:

TABLE XI

| Aging temperatures, ° C. | | | | |
|---|---|---|---|---|
| 225 | 250 | 275 | 300 | 325 |
| 2,688 hours, all O.K | 2,688 hours, 6 O.K. | 926 hours avg. life. | 176 hours avg. life. | 111 hours avg. life. |

By appropriate calculation, expressing the temperatures as reciprocal of absolute temperature and expressing the service lives as logarithms and extrapolating, there may be determined from the above data that a life of 100,000 hours at greater than 180° C. may be expected.

EXAMPLE XV

Example XIII is repeated, except that for each mol of bis-(hydroxymethylphenyl)-ether, slightly more than 1 mol of epichlorohydrin was used. The results were substantially the same; no epoxide equivalent was found in the resultant resin.

EXAMPLE XVI

Into the reaction flask there are placed 230 grams (1 mol) of bis-(hydroxymethylphenyl)-ether, 184 grams (2 mols) of epichlorohydrin, 420 cubic centimeters of dimethyl acetamide and 1 gram of stannous tetrachloride. This mixture is heated to 120° C. and held for 1 hour. There are then added to the mixture 162 grams (2 mols) of sodium aluminate. The resultant mixture is heated at 120° C. for 1.5 hours, cooled and filtered. This produces a deep red solution, which is again placed into a reaction flask, and 230 grams (1 mol) of bis-(hydroxymethylphenyl)-ether are added. The mixture is heated to a temperature in the range of about 120° C.–135° C., and reaction progresses between the bis-(hydroxymethylphenyl)-ether and the glycidyl ether resulting from the reaction of epichlorohydrin and bis-(hydroxymethylphenyl)-ether. As needed, stannous tetrachloride is added to maintain the mixture on the acidic side. It is found that over a period of reaction of 3.5 hours at 135° C., it is necessary to add 0.35 mol of stannous tetrachloride. The reaction mixture thus produced is filtered and the solvent is removed at reduced pressure. This yields a viscous resin that is able to be poured hot and solidified to a brown waxy state. The solid resin is re-dissolved in 10% by weight of dimethyl acetamide, and to this solution there are added 30 parts by weight per 100 parts of resin of m-phenylene diamine. This mixture is heated in an open beaker for 1.5 hours at 130° C.–150° C., producing a deep red liquid. The deep red liquid is useful as a surface-coating material for laminates, tubes and helical coils. Upon further heating under vacuum, the solvent is removed entirely and the resultant material may be poured hot, cooled to a solid, ground to a fine powder, and used as molding compound or in fluidized-bed applications.

While we have shown and described herein certain embodiments of our invention, we intend to cover as well any change or modification therein which may be made without departing from its spirit and scope.

We claim as our invention:

1. A method comprising reacting bis(hydroxymethylphenyl)-ether with epichlorohydrin in the presence of a high-boiling solvent and $SnCl_4$ catalyst, using about 2 mols of epichlorohydrin per mol of bis-(hydroxymethylphenyl)-ether; adding to the resultant solution a reagent selected from the group consisting of sodium aluminate and sodium hydroxide and an amount of bis-(hydroxymethylphenyl)-ether substantially equivalent to that previously used; heating the mixture mildly with periodic additions of $SnCl_4$ as required to maintain the reaction mixture acidic to obtain a viscous resin; and recovering said viscous resin by removing solvent, said resins being soluble in dimethylacetamide and capable of reacting with m-phenylene diamine when heated therewith for 1.5 hours at 130 to 150° C.

References Cited

UNITED STATES PATENTS 3,298,981    1/1967    Fry et al. _____ 260—18

FOREIGN PATENTS 901,208    7/1962    Great Britain.

OTHER REFERENCES

Szmant et al., "Relative Chloromethylation Rates of Some Aromatic Compounds," J.A.C.S. *71*, 3763–5 (1949).

WILLIAM H. SHORT, Primary Examiner

E. A. NIELSEN, Assistant Examiner

U.S. Cl. X.R.

260—47 EP, 47 EN